US010288173B2

(12) United States Patent
Chapagain et al.

(10) Patent No.: US 10,288,173 B2
(45) Date of Patent: *May 14, 2019

(54) SEAL MEMBER FOR JOINT OF MACHINE AND METHOD OF ASSEMBLING SAME

(71) Applicant: Caterpillar Inc., Peoria, IL (US)

(72) Inventors: Pradeep Chapagain, Peoria Heights, IL (US); Sunil I. Mathew, Peoria, IL (US); Charles Taylor Hudson, Decatur, IL (US)

(73) Assignee: Caterpillar Inc., Deerfield, IL (US)

( * ) Notice: Subject to any disclaimer, the term of this patent is extended or adjusted under 35 U.S.C. 154(b) by 595 days.

This patent is subject to a terminal disclaimer.

(21) Appl. No.: 14/837,492

(22) Filed: Aug. 27, 2015

(65) Prior Publication Data
US 2016/0097454 A1 Apr. 7, 2016

Related U.S. Application Data

(60) Provisional application No. 62/060,384, filed on Oct. 6, 2014.

(51) Int. Cl.
F16J 15/3284 (2016.01)
F16C 11/04 (2006.01)
(Continued)

(52) U.S. Cl.
CPC .......... F16J 15/3284 (2013.01); F16C 11/04 (2013.01); F16C 11/06 (2013.01); F16J 3/042 (2013.01);
(Continued)

(58) Field of Classification Search
CPC ......... Y10T 403/315; Y10T 403/32729; Y10T 403/31; F16C 11/0671; F16C 11/0676;
(Continued)

(56) References Cited

U.S. PATENT DOCUMENTS 3,248,955 A * 5/1966 Templeton ............. B60G 7/005
277/635
3,343,855 A * 9/1967 Husen .................... B60G 7/005
277/391
(Continued)

FOREIGN PATENT DOCUMENTS

GB 771254 3/1957
JP 29-63839 B2 10/1999
(Continued)

Primary Examiner — Matthew R McMahon
(74) Attorney, Agent, or Firm — Leydig, Voit & Mayer, LTD.

(57) ABSTRACT

A seal member for a joint between a pivot member movable about a rotational axis of a shaft includes a ring, a flange, and a resiliently flexible intermediate portion interposed therebetween. The ring includes annular distal and proximal ring faces disposed in spaced relationship to each other along a longitudinal axis. The flange includes a pair of flange faces disposed in spaced relationship to each other along the longitudinal axis. The flange includes outer and inner flange surfaces extending along the longitudinal axis between the pair of flange faces at, respectively, outer and inner flange perimeters thereof. The intermediate portion is connected to the proximal ring face of the ring and to the inner circumferential flange surface of the flange such that the ring is relatively movable with respect to the flange.

20 Claims, 11 Drawing Sheets

(51) Int. Cl.
*F16J 3/04* (2006.01)
*F16C 11/06* (2006.01)
*F16C 33/72* (2006.01)
*F16C 33/74* (2006.01)
*F16C 17/10* (2006.01)

(52) U.S. Cl.
CPC .......... *F16C 17/105* (2013.01); *F16C 33/723* (2013.01); *F16C 33/74* (2013.01); *F16C 2326/01* (2013.01)

(58) Field of Classification Search
CPC .... F16C 2326/05; F16J 3/042; F16J 15/3284; F16J 15/52; F16D 3/845; B60G 7/005
USPC ................................. 277/634, 635
See application file for complete search history.

(56) References Cited

U.S. PATENT DOCUMENTS

| | | | |
|---|---|---|---|
| 3,391,952 A | 7/1968 | Zeigler | |
| 3,897,070 A * | 7/1975 | Anderson | F16J 15/52 277/315 |
| 3,901,518 A * | 8/1975 | Uchida | F16C 11/0671 277/635 |
| 4,121,844 A * | 10/1978 | Nennoto | F16C 11/0671 277/635 |
| 4,322,175 A * | 3/1982 | Szczesny | F16B 21/20 277/635 |
| 4,553,760 A * | 11/1985 | Reed | F16C 11/0666 180/9.5 |
| 4,650,362 A * | 3/1987 | Kubo | F16C 11/0671 277/590 |
| 5,066,159 A | 11/1991 | Urbach | |
| 5,318,480 A * | 6/1994 | Essi | F16J 3/048 277/636 |
| 5,466,084 A * | 11/1995 | Brueggen | F16C 11/0671 277/635 |
| 5,538,275 A * | 7/1996 | Lomnick | B60G 7/005 277/635 |
| 5,544,963 A | 8/1996 | Kajihara et al. | |
| 5,649,779 A | 7/1997 | Martin et al. | |
| 5,931,597 A * | 8/1999 | Urbach | B60G 7/005 403/122 |
| 6,022,068 A | 2/2000 | D'Amico | |
| 6,042,294 A * | 3/2000 | Urbach | B60G 3/20 403/122 |
| 6,345,858 B1 | 2/2002 | Franklin et al. | |
| 6,349,470 B1* | 2/2002 | Sasaki | F16C 11/0614 29/898.062 |
| 6,530,711 B2* | 3/2003 | Menotti | F16C 11/0671 277/635 |
| 6,582,146 B2* | 6/2003 | Raymoure | F16C 11/0671 277/636 |
| 6,592,171 B1 | 7/2003 | Hinds | |
| 6,626,575 B2 | 9/2003 | Hartl | |
| 6,764,243 B1* | 7/2004 | Inuzuka | F16J 3/045 277/634 |
| 6,858,809 B2 | 2/2005 | Bender | |
| 6,866,271 B2* | 3/2005 | MacDonald | F16J 15/3276 277/353 |
| 7,090,273 B2 | 8/2006 | Stojkovic et al. | |
| 7,100,256 B2 | 9/2006 | D'Amico et al. | |
| 7,261,487 B2* | 8/2007 | Urbach | B60G 7/005 403/114 |
| 7,670,078 B2* | 3/2010 | Elterman | F16C 11/0671 277/635 |
| 7,704,007 B2* | 4/2010 | Elterman | F16D 3/845 277/635 |
| 8,622,644 B2* | 1/2014 | Becker | F16C 11/045 403/134 |
| 8,647,010 B2* | 2/2014 | Losche | B60G 7/005 280/124.156 |
| 8,991,429 B2* | 3/2015 | Yoshimoto | E02F 9/2004 137/636.1 |
| 9,446,644 B2* | 9/2016 | Wilcutt | B60G 7/005 |
| 9,562,567 B2* | 2/2017 | Voisine | F16C 33/74 |
| 9,829,044 B2* | 11/2017 | Clark | F16C 33/74 |
| 2007/0122232 A1* | 5/2007 | Buchner | F16C 11/0614 403/122 |
| 2009/0232589 A1 | 9/2009 | Kuru | |
| 2013/0256993 A1 | 10/2013 | Burd et al. | |
| 2014/0050548 A1 | 2/2014 | Loewe et al. | |
| 2014/0099181 A1 | 4/2014 | Giles-Brown et al. | |
| 2014/0175756 A1 | 6/2014 | Ikeda | |
| 2014/0203518 A1 | 7/2014 | Bian et al. | |
| 2015/0322998 A1* | 11/2015 | Lee | F16C 11/0614 403/133 |

FOREIGN PATENT DOCUMENTS

| | | | | |
|---|---|---|---|---|
| JP | | 2000-25658 A | 1/2000 | |
| WO | WO-2004083660 A1 * | | 9/2004 | ......... F16C 11/0628 |

* cited by examiner

SEAL MEMBER FOR JOINT OF MACHINE AND METHOD OF ASSEMBLING SAME

CROSS-REFERENCE TO RELATED APPLICATION

This patent application claims the benefit of priority to U.S. Patent Application No. 62/060,384, filed Oct. 6, 2014, and entitled "Seal Member for Joint of Machine and Method of Assembling Same," which application is incorporated in its entirety herein by this reference.

TECHNICAL FIELD

This patent disclosure relates generally to a seal member for a joint assembly of a machine and, more particularly, to a seal member for a maintenance-free bearing of a joint assembly of an off-highway machine.

BACKGROUND

Off-highway machines having a dump body operate in a variety of environments. Such machines can include one or more hoist cylinders configured to selectively pivot the dump body about its rear end from a normal position to a range of dumping positions. During the dumping process, the end of the hoist cylinder connected to the frame of the machine can pivot about a bearing to accommodate the different orientation of the dump body. The operational efficiency of the hoist cylinder can be impaired should contaminants —such as mud, for example—infiltrate the bearing. For example, should debris accumulate in the bearing, the operation of the bearing can be impaired such that it experiences increased mechanical loads that lead to early failure or damage the bearing. It is desirable to provide a robust seal that protects the bearing from the outside environment.

U.S. Patent Application Publication No. 2014/0203518 is entitled, "Elastomeric Shaft Seal Formed Without Oven Post Curing," and is directed to an elastomeric seal (20), such as a shaft seal for automotive vehicle applications. The elastomeric seal (20) includes an elastomeric compound (22) chemically coupled to a metal sealing ring (24) and is formed without an oven post curing step. The elastomeric seal (20) has an elastic modulus of 6.0 MPa to 13.0 MPa and a tensile strength of 11.1 MPa to 14.8 MPa. The elastomeric compound (22) includes 52.0 to 68.0 wt. % fluoroelastomer, 20.0 to 35.0 wt. % calcium silicate, and 5.0 to 15.0 wt. % diatomite. The elastomeric compound (22) is fully cured and chemically coupled to the metal sealing ring (24) during the compression or injection molding step, and thus an oven post curing step is not required.

It will be appreciated that this background description has been created by the inventors to aid the reader, and is not to be taken as an indication that any of the indicated problems were themselves appreciated in the art. While the described principles can, in some respects and embodiments, alleviate the problems inherent in other systems, it will be appreciated that the scope of the protected innovation is defined by the attached claims, and not by the ability of any disclosed feature to solve any specific problem noted herein.

SUMMARY

In an embodiment, the present disclosure describes a seal member for a joint between a pivot member movable about a rotational axis of a shaft. The seal includes a ring, a flange, and an intermediate portion interposed between the ring and the flange.

The ring includes a distal ring face and a proximal ring face. The distal ring face and the proximal ring face are both annular and are disposed in spaced relationship to each other along a longitudinal axis.

The flange includes a pair of flange faces disposed in spaced relationship to each other along the longitudinal axis. The flange includes an outer flange surface extending along the longitudinal axis between the pair of flange faces at an outer flange perimeter thereof. The flange includes an inner circumferential flange surface extending along the longitudinal axis between the pair of flange faces at an inner flange perimeter thereof. The inner circumferential flange surface is disposed radially within the outer flange surface.

The intermediate portion is resiliently flexible. The intermediate portion is connected to the proximal ring face of the ring and to the inner circumferential flange surface of the flange such that the ring is relatively movable with respect to the flange.

In another embodiment, a joint assembly for a machine is provided. The joint assembly includes a shaft defining a rotational axis, a pivot member mounted with respect to the shaft such that the pivot member is pivotable about the rotational axis with respect to the shaft, and a seal member mounted to the pivot member and pivotable about the rotational axis with respect to the shaft. The seal member includes a ring, a flange, and an intermediate portion interposed between the ring and the flange along the rotational axis.

The ring is adjacent the pivot member. The ring includes a distal ring face and a proximal ring face. The distal ring face and the proximal ring face are both annular and are disposed in spaced relationship to each other along the rotational axis. The ring includes an inner circumferential ring surface extending along the rotational axis between the distal ring face and the proximal ring face at an inner ring perimeter thereof. The inner ring perimeter defines a ring opening. The shaft extends through the ring opening.

The flange is disposed in spaced relationship to the ring along the rotational axis. The flange includes a pair of flange faces disposed in spaced relationship to each other along the rotational axis. The flange includes an outer flange surface extending along the rotational axis between the pair of flange faces at an outer flange perimeter thereof. The flange includes an inner circumferential flange surface extending along the rotational axis between pair of flange faces at an inner flange perimeter thereof. The inner circumferential flange surface is disposed radially within the outer flange surface. The inner circumferential flange surface defines a flange opening. The shaft extends through the flange opening. The flange is fixed relative to the pivot member.

The intermediate portion is resiliently flexible. The intermediate portion is connected to the proximal ring face of the ring and to the inner circumferential flange surface of the flange such that the ring is relatively movable with respect to the flange. The intermediate portion defines an intermediate passage. The shaft extends through the intermediate passage. The shaft and the intermediate portion having an interfering fit therebetween such that at least a portion of the intermediate portion is flexed radially outwardly.

In still other embodiments, a method of assembling a joint of a machine is provided. The method includes mounting a seal member, a bearing, and a pivot member to a shaft.

The shaft defines a rotational axis. The seal member includes a ring, a flange, and an intermediate portion interposed between the ring and the flange. The ring includes an inner circumferential ring surface at an inner ring perimeter defining a ring opening. The shaft extends through the ring opening. The inner circumferential ring surface of the ring is in proximate relationship with the shaft with a slip fit therebetween such that the ring is pivotable about the rotational axis with respect to the shaft. The intermediate portion is resiliently flexible. The intermediate portion defines an intermediate passage. The shaft extends through the intermediate passage. The flange extends radially from the intermediate portion and circumscribes the shaft.

The pivot member has a mounting head defining a mounting passage therethrough. The bearing is disposed within the mounting passage. The bearing and the mounting head are in circumscribing relationship with the shaft. The pivot member is movable relative to the shaft about the rotational axis.

The method further includes abutting the ring of the seal member to an inboard bearing side of the bearing. The flange of the seal member is connected to the pivot member such that the seal member is movable relative to the shaft about the rotational axis.

Further and alternative aspects and features of the disclosed principles will be appreciated from the following detailed description and the accompanying drawings. As will be appreciated, the principles related to a seal member for a joint assembly of a machine and a method of assembling a joint of a machine disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

The present disclosure relates generally to a joint assembly of a machine. In embodiments, the present disclosure relates to a seal member of a joint assembly for a machine. In embodiments, the present disclosure relates to a seal member for a maintenance-free bearing of a joint assembly of an off-highway machine. In embodiments, the present disclosure relates to a method of assembling a joint of a machine.

In embodiments, a seal member for a joint between a pivot member movable about a rotational axis of a shaft is provided. The seal member can include a ring, a flange, and a resiliently flexible intermediate portion interposed between the ring and the flange. In embodiments, the ring and the flange are both more rigid than the intermediate portion.

In embodiments, the joint assembly includes a shaft defining a rotational axis, a pivot member mounted with respect to the shaft such that the pivot member is pivotable about the rotational axis with respect to the shaft, and a seal member mounted to the pivot member and pivotable about the rotational axis with respect to the shaft. The seal member includes a ring, a flange, and an intermediate portion interposed between the ring and the flange along the rotational axis. The intermediate portion is resiliently flexible, and the ring and the flange are both more rigid than the intermediate portion.

In embodiments, a bearing can be interposed between the pivot member and the shaft. In embodiments, the bearing can be a maintenance-free bearing which is designed to be used without additional lubricant being applied at the bearing interface after installation.

In embodiments, the shaft and the intermediate portion have an interfering fit therebetween such that at least a portion of the intermediate portion is flexed radially outwardly. The ring can be in contacting, proximate relationship with the shaft with a slip fit therebetween such that the ring is pivotable about the rotational axis with respect to the shaft. The seal member can be mounted to the pivot member such that the intermediate portion is compressed along the rotational axis such that the ring is urged toward the pivot member into abutting relationship therewith.

Figure 1:
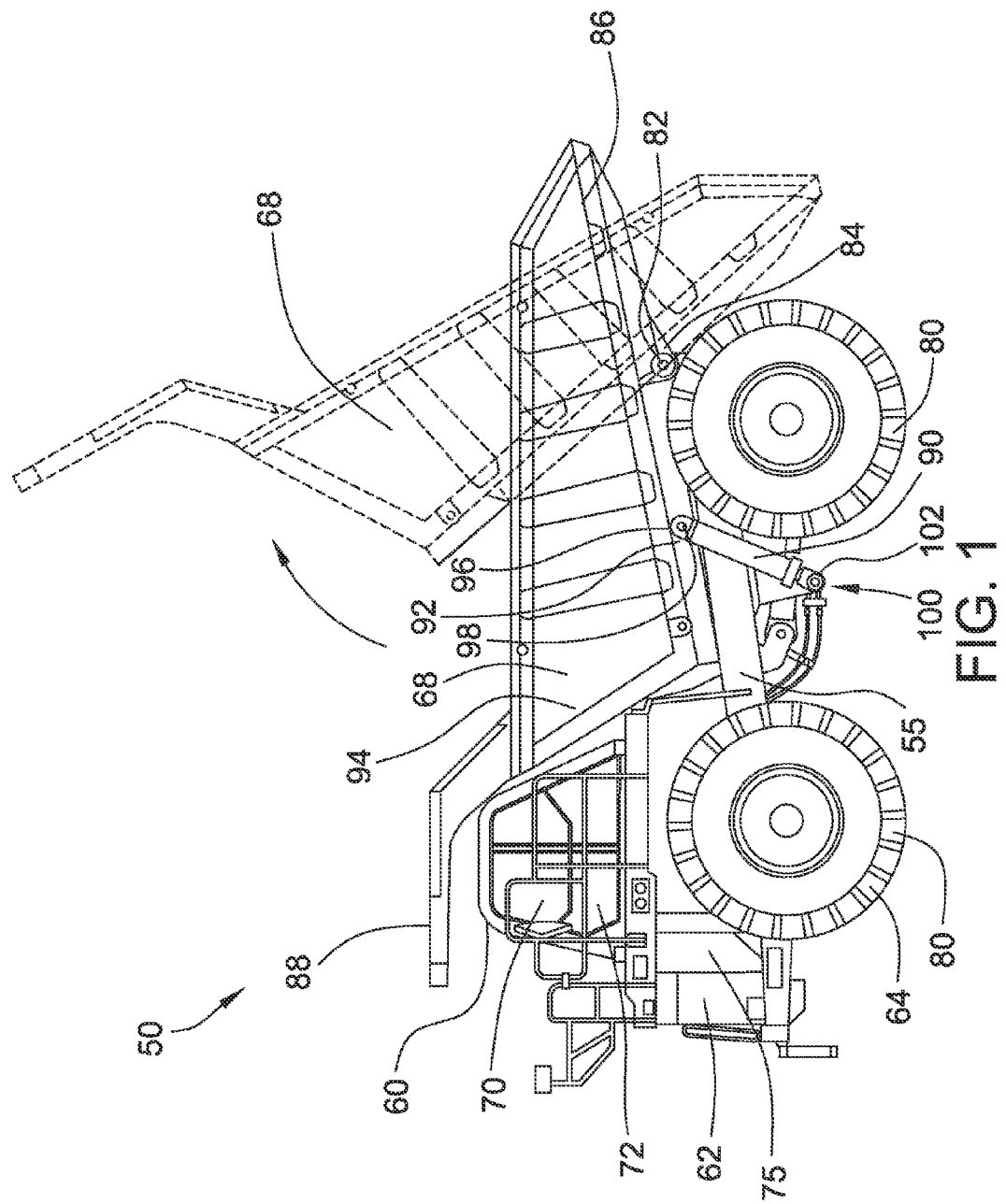
FIG. 1 is a diagrammatic side view of an embodiment of a machine in the form of an off-highway truck suitable for use with an embodiment of a joint assembly having an embodiment of a seal member constructed in accordance with principles of the present disclosure.

Turning now to the Figures, there is shown in FIG. 1 an exemplary embodiment of a machine 50 in the form of an off-highway truck. In the illustrated embodiment, the machine is a large self-propelled off-highway vehicle capable of carrying tons of material in operations such as mining and the like. The machine 50 has a chassis 55 which supports an operator station 60, a power system 62, a drive system 64, and a dump body 68.

In other embodiments, the machine 50 can be any other suitable machine for use with a joint assembly having a seal member constructed in accordance with principles of the present disclosure. Examples of such machines include mobile or fixed machines used for construction, farming, mining, forestry, transportation, and other similar industries. In some embodiments, the machine can be an excavator, wheel loader, backhoe, crane, compactor, dozer, wheel tractor-scraper, material-handling machine, or any other suitable machine which includes a joint assembly with a seal.

The operator station 60 includes controls for operating the machine 50 via the power system 62. The illustrated operator station 60 is configured to define an interior cabin 70 within which the operator controls are housed and which is accessible via a door 72. Specifically, the operator station 60 can include one or more operator interface devices configured for use by a machine operator to maneuver the machine 50 and perform tasks with the machine 50, for example. Examples of operator interface devices include, but are not limited to, a joystick, a steering wheel, and/or a pedal as are well known and understood in the industry.

The power system 62 is configured to supply power to the machine 50. The power system 62 is operably arranged with the operator station 60 to receive control signals from the controls in the operator station 60 and with the drive system 64 and the dump body 68 to selectively operate the drive system 64 and/or the dump body 68 according to control signals received from the operator station 60. The power system 62 is adapted to provide operating power for the propulsion of the drive system 64 and the operation of the dump body 68 as is understood by those having ordinary skill in the art.

In embodiments, the power system 62 can include an engine, a cooling system or package, a transmission, and a hydraulic system, for example, housed at least in part within an engine compartment 75 supported by the chassis 55. In embodiments, the engine can be any suitable engine, such as, an internal combustion engine, a diesel engine, a gasoline engine, a gaseous fuel-powered engine or any other type of suitable engine. In embodiments, the power system 62 can include a number of engines. The cooling system can be configured to cool the engine(s) of the power system 62.

The hydraulic system can include a plurality of components such as pumps, valves, and conduits, along with a hydraulic fluid reservoir (not shown). The hydraulic system, as well as other systems in the machine, may include its own cooling arrangement.

The drive system 64 is in operable arrangement with the power system 62 to selectively propel the machine 50 via control signals sent through the operator station 60. The drive system 64 can include a plurality of ground-engaging members, such as, wheels 80 as shown in the illustrated embodiment, which can be movably connected to the chassis 55 through axles, drive shafts or other components (not shown). In embodiments, the drive system 64 can be provided in the form of a track-drive system, a wheel-drive system, or any other type of drive system configured to propel the machine 50.

The dump body 68 defines a storage compartment configured to carry a payload, such as mined material, for example, within it. The dump body 68 is pivotably attached to the chassis 55 by a pair of pivot pins 82 respectively extending through a pair of body supports 84 projecting form the dump body 68 and located toward a rear end 86 of the dump body 12, one on each side of the dump body 68.

The pivot pins 82 define a dump body pivot axis about which the dump body 68 can rotate relative to the chassis 55. The dump body 68 is movable over a range of travel between a storage position (shown in FIG. 1) and a fully-inclined dumping position (shown in dashed lines in FIG. 1).

The dump body 68 includes a canopy 88 that extends outwardly from the dump body 68 when the dump body 68 is in the storage position, as shown in FIG. 1. When the dump body 68 is in the storage position, the canopy 88 extends over the operator station 60 and is configured to protect the operator station from debris falling overhead during loading of the dump body 68.

In other embodiments, a different style of dump body 68 can be used. In embodiments, the dump body 68 can include a tailgate at the rear end 86 thereof which is adapted to move between an open position and a closed position.

In embodiments, at least one actuator 90 is provided that is adapted to selectively move the dump body over the range of travel between the storage position and the fully-inclined dumping position. In embodiments, the actuator 90 can be any suitable actuator, such as an extendable cylinder in the form of a hydraulic cylinder or a hydro-pneumatic cylinder, for example, as is well known to those skilled in the art. In embodiments, the machine 50 can include a single extendable cylinder, for example, a pair of extendable cylinders as is customary, or more than two cylinders to selectively pivot the dump body 68.

In the illustrated embodiment, a pair of actuators in the form of extendable cylinders 90 is provided. Each of the extendable cylinders 90 is pivotably connected to a respective side of the chassis 55 and the dump body 68. Each extendable cylinder 90 is moveable over a range of travel between a refracted position (as shown in FIG. 1) and an extended position to place the dump body 68 in the storage position and the fully-inclined position, respectively.

A pair of cylinder brackets 92 is provided between a front end 94 of the dump body 68 and the body supports 84. Each cylinder bracket 92 is adapted to receive an upper end 96 of one of the extendable cylinders 90, which can be pivotably mounted thereto via a pin 98, for example. A pair of joint assemblies 100 constructed in accordance with principles of the present disclosure is provided to pivotably mount a lower end 102 of a respective extendable cylinder 90 to the chassis 55.

In the illustrated embodiment, when the cylinders 90 are in the retracted position, the dump body 68 is in the storage position for receiving payload therein. When the cylinders 90 are in the extended position, the front end 94 of the dump body 68 is raised relative to the chassis 55 to pivot the dump body 68 about the pivot axis to one of a series of dumping positions up to the fully-inclined dumping position for expelling the payload stored within the dump body 68 from the rear end 86 thereof. This movement of dump body 68 can be controlled using an operator interface device housed in the operator station 60 in a conventional manner.

Figure 2:
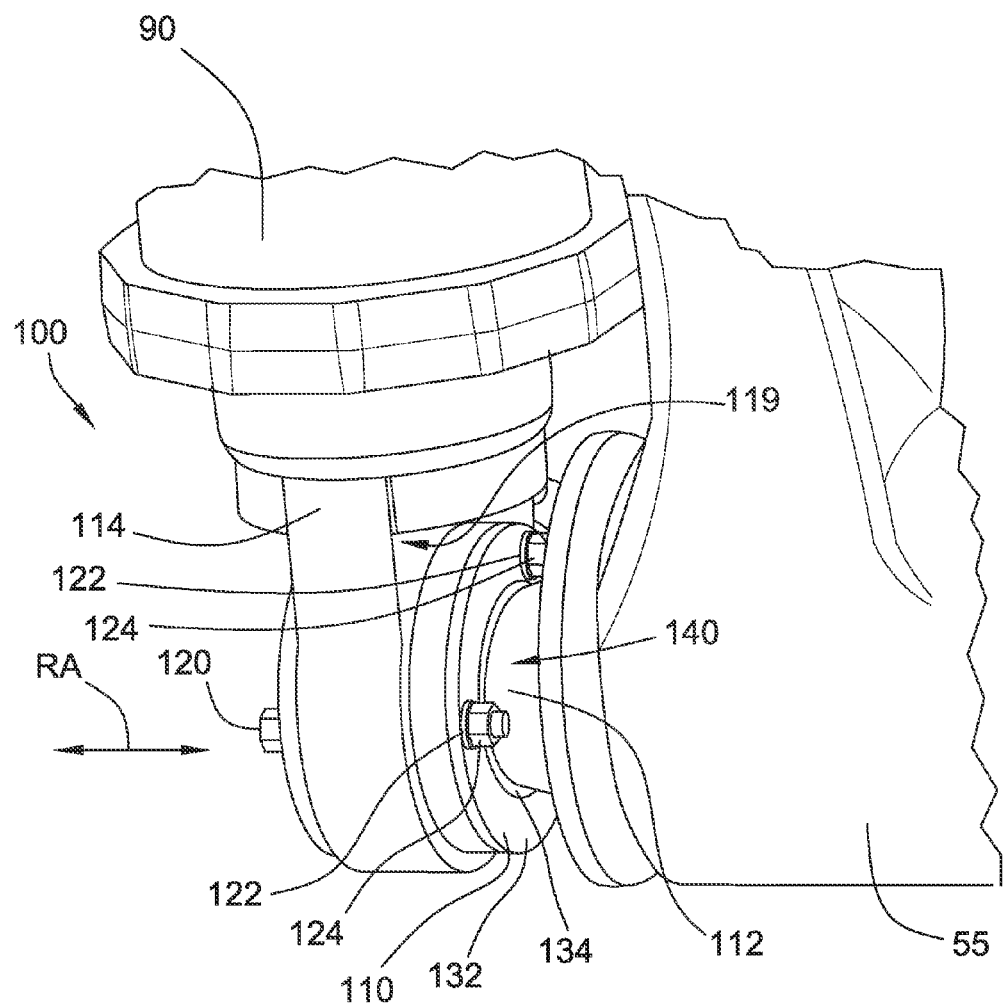
FIG. 2 is an enlarged, perspective view of the joint assembly of FIG. 1.

Referring to FIG. 2, an exemplary embodiment of a joint assembly 100 constructed in accordance with principles of the present disclosure is shown. The joint assembly 100 includes a seal member 110 constructed in accordance with principles of the present disclosure. The joint assembly 100 of FIG. 2 is provided in the machine 50 of FIG. 1 to pivotably mount the lower end 102 of the extendable cylinder 90 used to selectively raise and lower the dump body 68 over a range of travel between the storage position and the fully-inclined dumping position. In other embodiments, a joint assembly 100 constructed in accordance with principles of the present disclosure can be used in other machines and can be used in other joint assembly applications, as will be appreciated by one skilled in the art. The illustrated joint assembly 100 includes a shaft 112, a pivot member 114, a bearing 118 (see FIGS. 6-8), and the seal member 110.

The shaft 112 is connected to, and projects from, the chassis 55 of the machine 50. In other embodiments, the shaft 112 can be mounted to a different component of the machine 50. The shaft 112 defines a rotational axis "RA."

The pivot member 114 is mounted with respect to the shaft 112 such that the pivot member 114 is pivotable about the rotational axis "RA" with respect to the shaft 112. In the illustrated embodiment, the pivot member 114 comprises the extendable cylinder 90. In other embodiments, the pivot member 114 of the joint assembly 100 can be a different kind of actuator and, in yet other embodiments, can be a different device, as will be appreciated by one skilled in the art.

The bearing 118 is interposed between the shaft 112 and the pivot member 114. In the illustrated embodiments, the bearing 118 is a spherical plain bearing. In embodiments, the bearing 118 can comprise a bearing which is sometimes referred to as a "maintenance-free" bearing inasmuch as additional lubricant is not applied at the bearing interface after installation. In embodiments, the bearing 118 can be any suitable type of bearing.

The seal member 110 is mounted to the pivot member 114 such that the seal member 110 is pivotable about the rotational axis "RA" with respect to the shaft 112. In the illustrated embodiment, the seal member 110 is mounted to an inboard pivot member side 119 of the cylinder 90.

In the illustrated embodiment, a plurality of fasteners 120 in the form of threaded bolts is used to secure components of the pivot member 114 and to secure the seal member 110 to the pivot member 114. In embodiments, any suitable fastener 120 can be used. The illustrated fasteners 120 include associated washers 122 and nuts 124 to help secure the components together.

The seal member includes a ring 130 (see, e.g., FIGS. 6 and 7), a flange 132, and an intermediate portion 134 interposed between the ring 130 and the flange 132 along the rotational axis "RA." The ring 130 is adjacent the pivot member 114. The flange 132 is fixed relative to the pivot member 114. The flange 132 is connected to the pivot member 114 such that the seal member 110 is movable relative to the shaft 112 about the rotational axis "RA." The intermediate portion 134 is resiliently flexible. The intermediate portion 134 can be placed in sealing engagement with an exterior surface 140 of the shaft 112 to provide a running seal therebetween.

Figure 3:
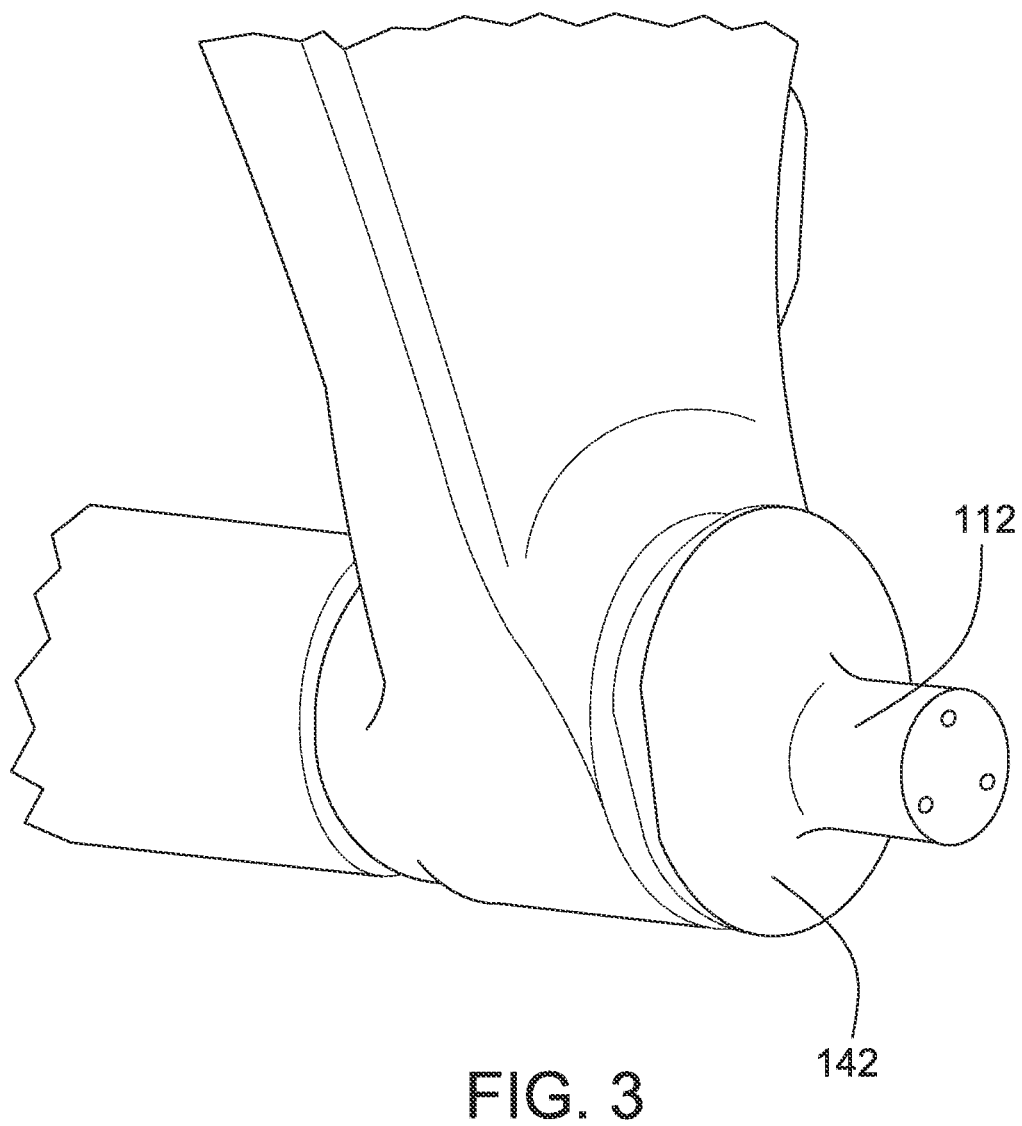
FIG. 3 is a perspective view of a trunnion of a frame of the machine of FIG. 1.
Figure 5:
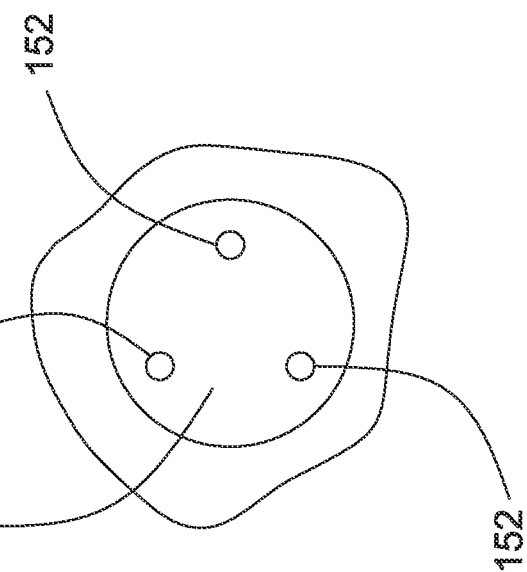
FIG. 5 is a fragmentary, end elevational view of the insert of FIG. 4.
Figure 4:
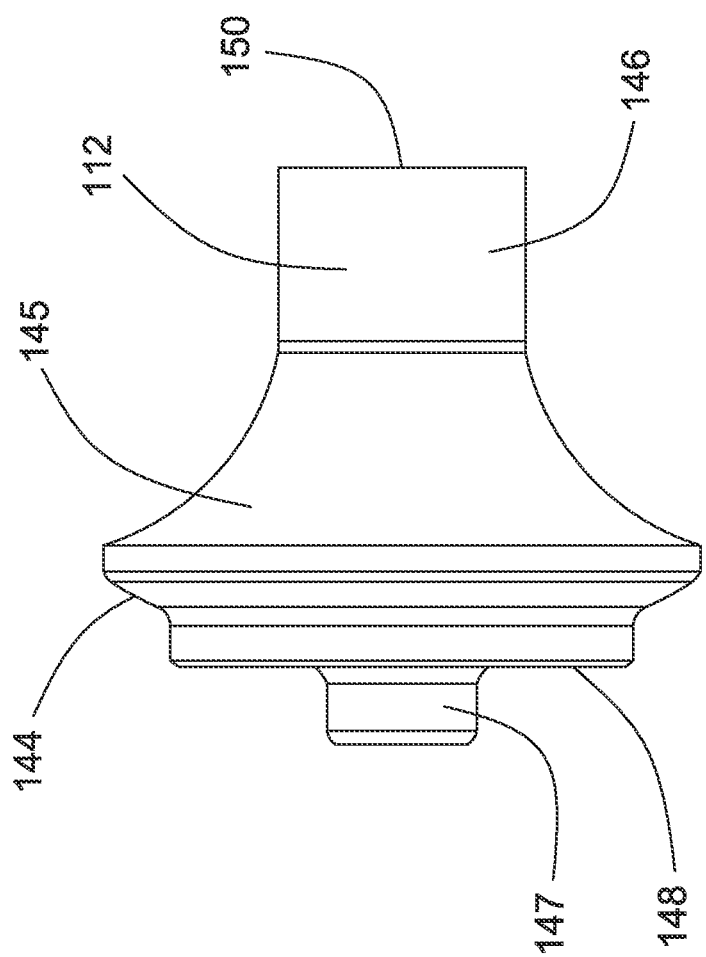
FIG. 4 is an elevational view of an insert having a trunnion suitable for mounting to a frame of a machine and for use in an embodiment of a joint assembly constructed in accordance with principles of the present disclosure.

Referring to FIGS. 3-5, the shaft 112 can project from a trunnion insert 142. The trunnion insert 142 can be used as original equipment of a machine or can be configured as a retrofit component for use in modifying a machine to include a joint assembly constructed in accordance with principles of the present disclosure.

Referring to FIG. 4, the trunnion insert 142 includes a base 144 and the shaft 112. The shaft 112 includes a concave taper surface 145 extending between the base 144 and a cylindrical portion 146 thereof 112. The insert 142 includes a mounting boss 147 projecting from a proximal end 148 thereof. The mounting boss 147 can be configured to facilitate the attachment of the trunnion insert 142 to the machine 50.

Referring to FIGS. 4 and 5, the shaft includes a distal end 150 having a plurality of bearing mounting holes 152 defined therein. In the illustrated embodiment, the bearing mounting holes 152 can be configured to accept fasteners therein which secure the inner ball or ring sphere of the bearing 118 to the shaft 112. In other embodiments, the number and/or arrangement of the bearing mounting holes 152 can be different.

Figure 6:
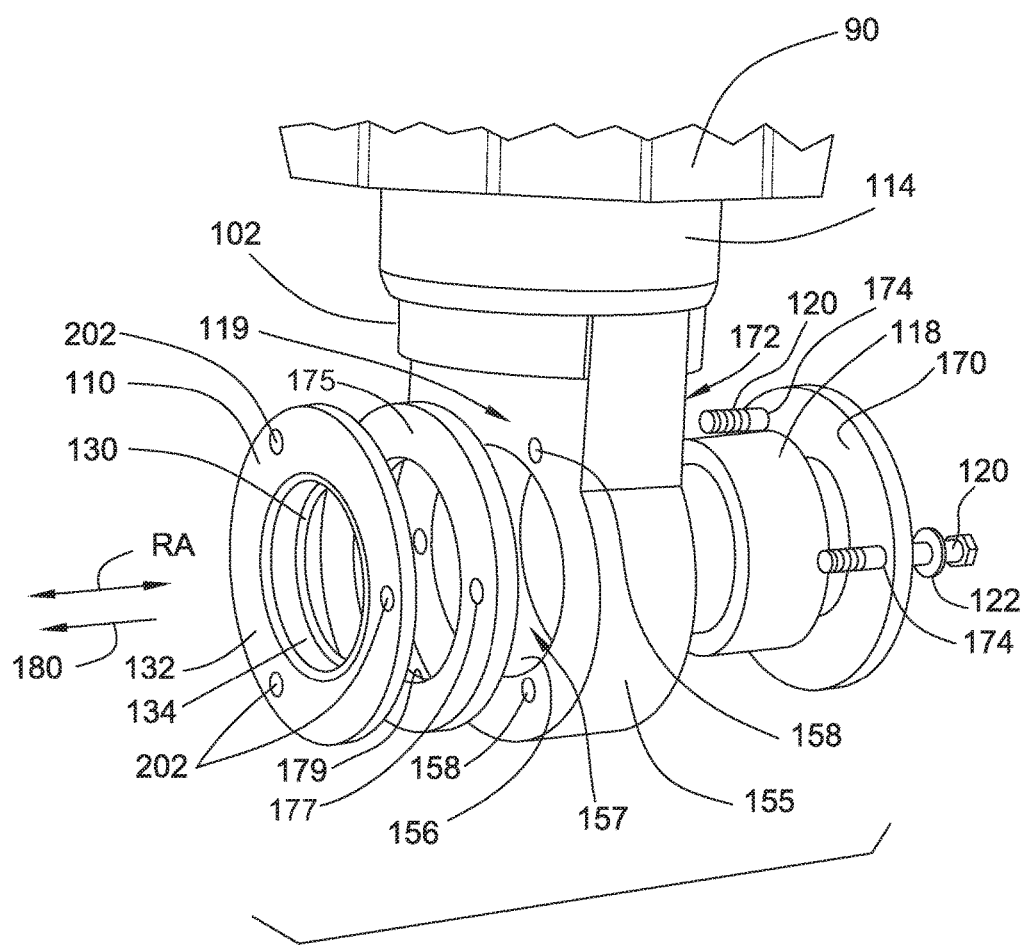
FIG. 6 is an exploded view of components of the joint assembly of FIG. 2 which are configured to be mounted on the trunnion of FIG. 3.

Referring to FIG. 6, the illustrated pivot member 114 comprises an extendable cylinder 90 having a mounting head 155 at the lower end 102 of the cylinder 90. The mounting head 155 includes an inner circumferential mounting head surface 156 that defines a mounting passage 157 therethrough. The mounting passage 157 is configured to accept therein the shaft 112 and the bearing 118. The bearing 118 can be disposed within the mounting passage 157 such that the bearing is interposed between the mounting head 155 of the cylinder 90 and the shaft 112. The mounting head 155 can include a plurality of fastener passages 158 configured to align with corresponding mounting holes of other components of the joint assembly 100 to accept the fasteners 120 therethrough.

The pivot member 114 includes an outer seal cover 170 which is mounted to an outboard side 172 thereof such that the mounting passage 157 is occluded from the outboard side 172 by the outer seal cover 170. The outer seal cover 170 can include a plurality of seal cover mounting holes 174 configured to align with corresponding mounting holes of other components of the joint assembly 100 to accept the fasteners 120 therein. In embodiments, the fasteners 120 can include washers 122 on the outboard side 172, as well.

The pivot member 114 includes an inner retention ring 175 mounted to the inboard pivot member side 119 thereof. The inner retention ring 175 can include a plurality of retention ring mounting holes 177 configured to align with corresponding mounting holes of other components of the joint assembly 100 to accept the fasteners 120 therein.

The inner retention ring 175 can be configured such that an inner circumferential retention ring surface 179 is disposed radially within the inner circumferential mounting head surface 156 when the inner retention ring 175 is mounted to the pivot member 114. The projecting annular portion of the retention ring which is in occluding relationship with the mounting passage 157 can be placed in interfering relationship with the bearing 118 disposed within the mounting passage 157 to inhibit relative movement of the bearing 118 along the rotational axis "RA" in an inboard direction 180 toward the inner retention ring 175 with respect to the mounting head 155 of the pivot member 114.

The seal member 110 is disposed adjacent the inboard pivot member side 119 of the pivot member 114. The seal member 110 at least partially occludes the mounting passage 157 from the inboard pivot member side 119. The flange 132 of the seal member 110 is connected to the inner retention ring 175 of the pivot member 114. The flange 132 can include a plurality of seal member mounting holes 202 configured to align with corresponding mounting holes of other components of the joint assembly 100 to accept the fasteners 120 therein.

Figure 7:
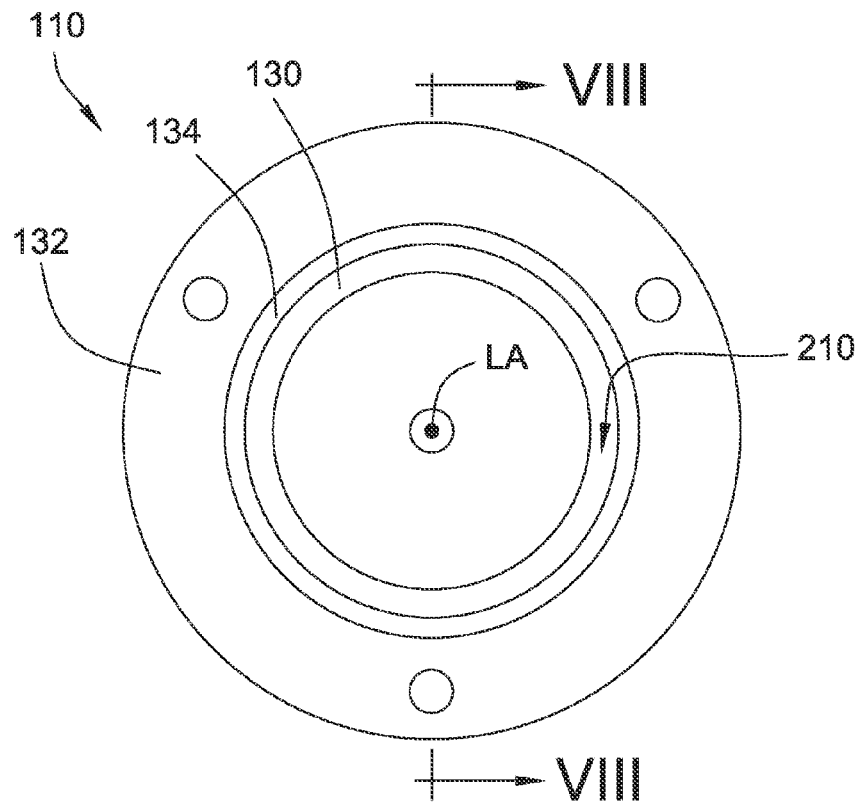
FIG. 7 is a plan view of an embodiment of a seal member constructed in accordance with principles of the present disclosure.
Figure 8:
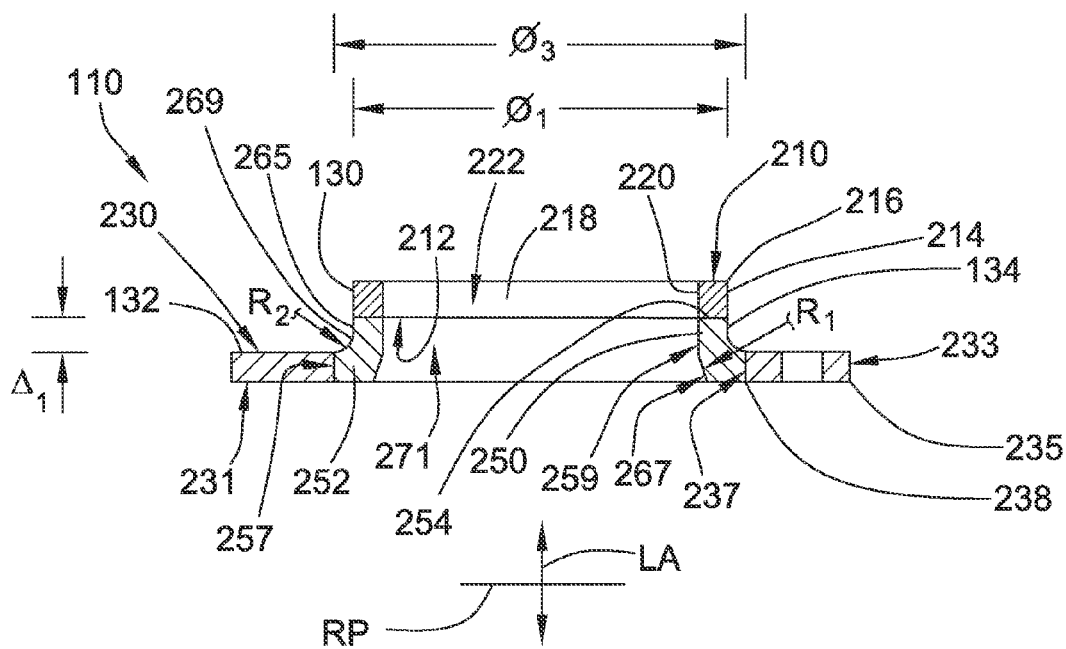
FIG. 8 is a cross-sectional view of the seal member of FIG. 7 taken along the line VIII-VIII in FIG. 7.

Referring to FIGS. 7 and 8, an exemplary embodiment of a seal member 110 constructed in accordance with principles of the present disclosure is shown. The seal member 110 can be included in a joint assembly 100 constructed in accordance with principles of the present disclosure. The seal member 110 of FIGS. 7 and 8 is used in the joint assembly 100 of FIG. 2 for the machine 50 of FIG. 1 to pivotably mount the lower end 102 of the extendable cylinder 90 used to selectively raise and lower the dump body 68 over a range of travel between the storage position and the fully-inclined dumping position. In other embodiments, a seal member 110 constructed in accordance with principles of the present disclosure can be used in other joint assemblies and/or machines and can be used in other seal member applications, as will be appreciated by one skilled in the art.

The illustrated seal member 110 includes the ring 130, the flange 132, and the intermediate portion 134 interposed between the ring 130 and the flange 132. In embodiments, the intermediate portion 134 is resiliently flexible, and the ring 130 and the flange 132 are both more rigid than the intermediate portion 134.

In embodiments, individual pieces of the seal member 110 can be constructed from materials different from the other components of the seal member 110. In embodiments, the ring 130 is made from nylon, the flange 132 is made from steel, and the intermediate portion 134 is made from rubber. In other embodiments, the materials used to construct the seal member 110 can be varied. Preferably, the materials used to construct the seal member 110 are non-reactive with common contaminants, such as mud, which may adhere to the pivot member and/or the seal member 110.

The ring 130 can be made from any suitable material, such as a suitable nylon, for example. In embodiments, the ring 130 is made from a material that is harder and more rigid than the material from which the intermediate portion 134 is made. In embodiments, the ring 130 can be made from a material that is suitably rigid to help prevent the intermediate portion 134 from buckling when the seal member is in a predetermined misaligned position.

The flange 132 can be made from any suitable material, such as metal, for example. In embodiments, the flange 132 is made from steel. In embodiments, the flange 132 is made from a material that is harder and more rigid than the material from which the intermediate portion 134 is made.

The intermediate portion 134 can be made from any suitable material, such as an elastomeric material, for example. In embodiments, the intermediate portion 134 is made from natural rubber. In other embodiments, the intermediate portion 134 may be made from other suitable materials including, for example, ethylene propylene diene monomer (EPDM), nitrile rubber, polyurethane, and styrene-butadiene rubber (SBR). Other suitable elastomers may be used in other embodiments. In embodiments, the intermediate portion 134 is made from a material which has a suitable flexibility to provide the ability of the ring 130 to move relative to the flange 132 with at least two degrees of freedom. In embodiments, the intermediate portion 134 is made from a material such that the ring 130 and the flange 132 are both more rigid than the intermediate portion 134. In embodiments, the intermediate portion is made from a material that is suitably resiliently compressible such that an adequate seal is provided between the intermediate portion and the shaft of the joint assembly within which the seal member 110 is used and that permits relative movement of the ring 130 and the flange 132 over an intended operational range of motion therebetween.

Referring to FIGS. 7, 8, 11, and 12, the ring 130 can be provided to help prevent the intermediate portion 134 from buckling when the joint assembly 100 is in a misaligned condition. The ring 130 can be adapted to help prevent mud and other contaminants from entering the mounting passage 157, which houses the bearing 118, from the inboard pivot member side 119.

The ring 130 of the seal member 110 includes a distal ring face 210 and a proximal ring face 212. The distal ring face 210 and the proximal ring face 212 are both annular and are disposed in spaced relationship to each other along a longitudinal axis "LA" of the seal member 110. When the seal member 110 is mounted to the pivot member 114 in the joint assembly 100, the longitudinal axis "LA" of the seal member is substantially aligned with, and parallel to, the rotational axis "RA" of the shaft 112 when the joint assembly 100 is in a normal condition. As such, spatial relationships described herein using the longitudinal axis "LA" are applicable to the rotational axis "RA," as well, and vice versa.

Figure 11:
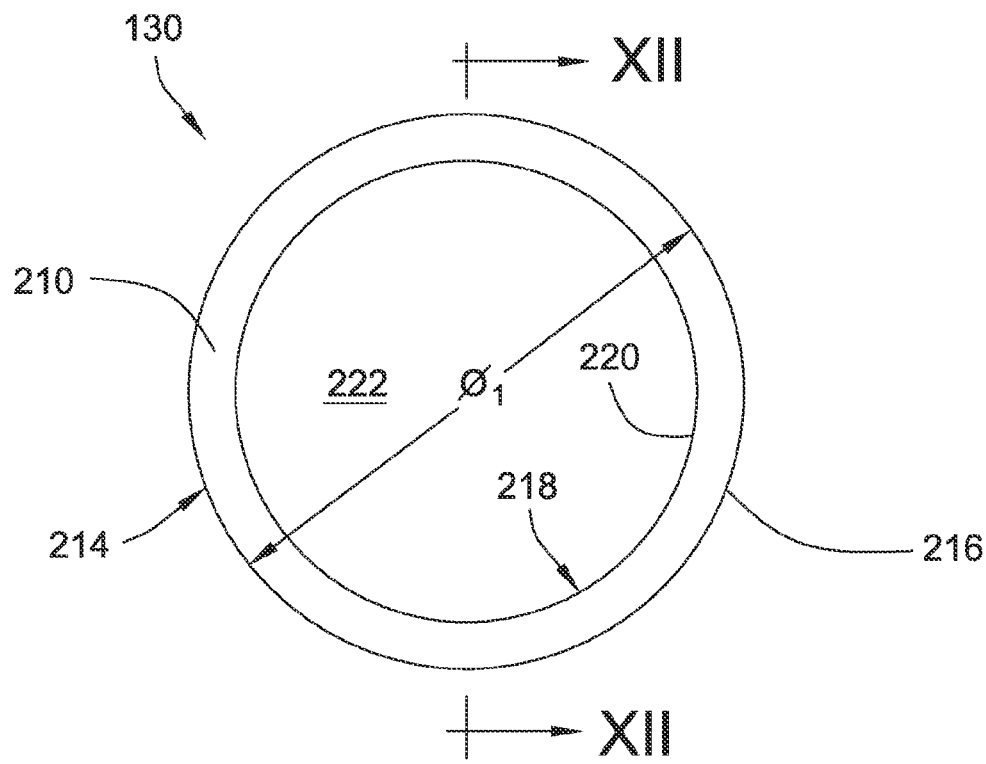
FIG. 11 is a plan view of a ring of the seal member of FIG. 7.
Figure 12:
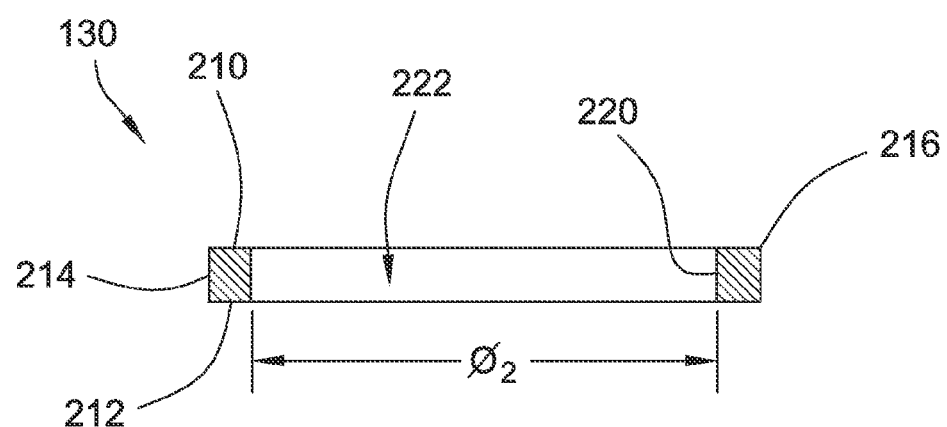
FIG. 12 is a cross-sectional view of the ring of FIG. 11 taken along the line XII-XII in FIG. 11.

Referring to FIGS. 8, 11, and 12, the ring 130 includes an outer circumferential ring surface 214 extending along the longitudinal axis "LA" between the distal ring face 210 and the proximal ring face 212 at an outer ring perimeter 216 thereof. The outer circumferential ring surface 214 circumscribes the distal ring face 210 and the proximal ring face 212. The outer circumferential ring surface 214 defines an outer ring diameter "$\varnothing_1$" (see FIG. 11).

The ring 130 includes an inner circumferential ring surface 218 extending along the longitudinal axis "LA" between the distal ring face 210 and the proximal ring face 212 at an inner ring perimeter 220 thereof. The inner ring perimeter 220 and the inner circumferential ring surface 218 define a ring opening 222 having an inner ring diameter "$\varnothing_2$" (see FIG. 12).

The ring opening 222 can be configured to allow the shaft 112 to extend therethrough. In embodiments, the ring opening 222 is sized relative to the exterior surface 140 of the shaft 112 such that there is a slip fit therebetween in which the inner circumferential ring surface 218 is rotatable with respect to the exterior surface 140 of the shaft 112 about the rotational axis "RA" of the shaft 112.

Referring to FIGS. 7-10, the flange 132 can be provided to connect the seal member 110 to the pivot member 114 such that the flange 132 is fixed relative to the pivot member 114. The flange 132 includes a pair of flange faces 230, 231 disposed in spaced relationship to each other along the longitudinal axis "LA." Referring to FIG. 8, the ring 130 is disposed in spaced relationship to the flange 132 along the longitudinal axis "LA" such that the proximal ring face 212 is disposed a longitudinal offset distance "$\Delta_1$" from the flange face 230 of the flange 132 that is closer.

The flange 132 includes an outer flange surface 233 extending along the longitudinal axis "LA" between the pair of flange faces 230, 231 at an outer flange perimeter 235 thereof. The flange 132 includes an inner circumferential flange surface 237 extending along the longitudinal axis "LA" between the pair of flange faces 230, 231 at an inner flange perimeter 238 thereof. The inner circumferential flange surface 237 is disposed radially within the outer flange surface 233.

Figure 9:
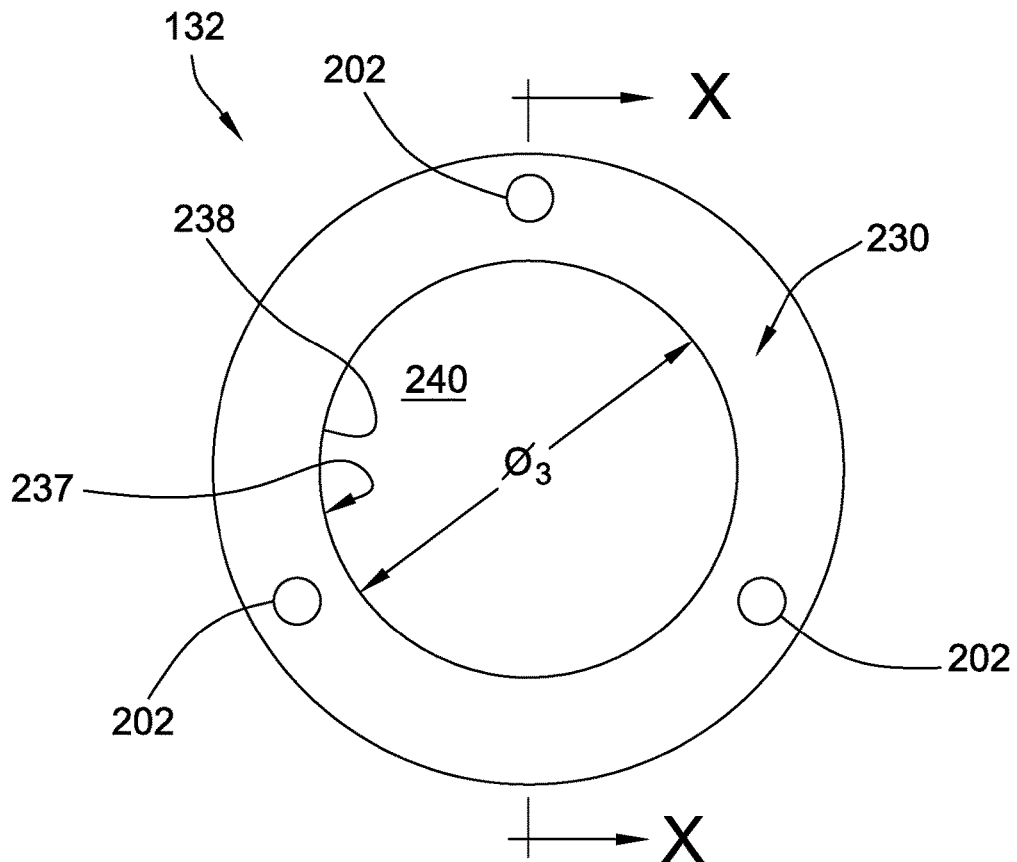
FIG. 9 is a plan view of a flange of the seal member of FIG. 7.
Figure 10:
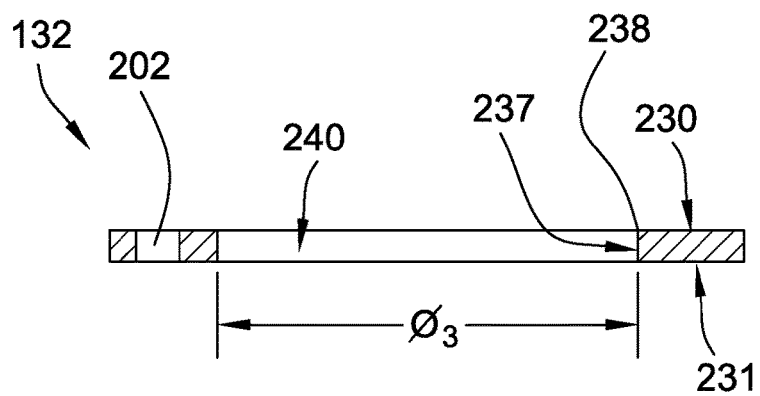
FIG. 10 is a cross-sectional view of the flange of FIG. 9 taken along the line X-X in FIG. 9.

Referring to FIGS. 9 and 10, the inner flange perimeter 238 and the inner circumferential flange surface 237 defines a flange opening 240 having an inner flange diameter "$\varnothing_3$." The flange opening 240 can be configured to allow the shaft 112 to extend therethrough. In embodiments, the outer ring diameter "$\varnothing_1$" of the ring 130 is less than the inner flange diameter "$\varnothing_3$" of the flange 132 (see FIG. 8).

Referring to FIGS. 9 and 10, the flange 132 can define at least one seal member mounting hole 202 configured to receive a fastener 120 therethrough for connecting the flange 132 to the pivot member 114. In embodiments, the flange 132 defines at least one seal member mounting hole 202 extending along the longitudinal axis "LA" between the flange faces 230, 231. In the illustrated embodiment, the flange 132 includes three seal member mounting holes 202 disposed in evenly spaced radial relationship to each about the flange faces 230, 231. The seal member mounting holes 202 can each receive a fastener 120 therethrough to connect the seal member 110 to the pivot member 114.

Referring to FIGS. 7 and 8, the intermediate portion 134 can be provided to provide a seal between the intermediate portion 134 and the exterior surface 140 of the shaft 112. The intermediate portion 134 can be adapted to allow the ring 130 to be movable relative to the flange 132 with at least two degrees of freedom. In embodiments, the intermediate portion 134 can help maintain the ring 130 in abutting relationship with the bearing 118.

The intermediate portion 134 is connected to the ring 130 and to the flange 132. The intermediate portion 134 is resiliently flexible such that the ring 130 is movable with respect to the flange 132 with at least two degrees of freedom. In embodiments, the ring 130 can rotate about the longitudinal axis "LA" with respect to the flange 132, and the ring 130 can translate along the longitudinal axis "LA" with respect to the flange 132. In embodiments, the ring 130 can also move relative to a radial plane, which is perpendicular to the longitudinal axis "LA," with respect to the flange 132 with at least two degrees of freedom. The intermediate portion 134 can flex in response to the relative movement between the ring 130 and the flange 132 to dissipate the forces generated by multiple motions of the joint (e.g., rotation, misalignment, and out of plane motion due to racking) and to resist fluid pressure exerted due to mud packing from outside the seal member 110.

In embodiments, the seal member 110 can be used as a seal with a shaft 112 that is non-cylindrical and/or where the pivot member 114 is eccentrically rotated relative to the shaft 112. The intermediate portion 134 can be configured to accommodate the relative translation of the ring 130 along a radial plane which is perpendicular to the longitudinal axis "LA." The ring 130 can be adapted to accommodate the shaft 112 therewithin over a range of relative rotation between the ring 130 and the shaft 112 about the longitudinal axis "LA," for example, over a range of about ten degrees, over a range of about five degrees, or over a range of about three degrees.

Referring to FIG. 8, in the illustrated embodiment, the intermediate portion 134 is connected to the proximal ring face 212 of the ring 130 and to the inner circumferential flange surface 237 of the flange 132 such that the ring 130 is relatively movable with respect to the flange 132. Any suitable technique can be used to connect the components of the seal member 110, such as, by being bonded together by adhesive, for example.

In embodiments, an adhesive can be used to connect the flange 132 and the intermediate portion 134. In embodiments, the adhesive used to bond the intermediate portion 134 to the flange 132 is compatible with the materials from which the flange 132 and the intermediate portion 134 are made (e.g., steel and natural rubber, respectively). In embodiments, an adhesive can be used to connect the ring 130 and the intermediate portion 134. In embodiments, the adhesive used to bond the intermediate portion 134 to the ring 130 is compatible with the materials from which the ring 130 and the intermediate portion 134 are made (e.g., nylon and natural rubber, respectively). In embodiments, the adhesive used to bond the intermediate portion 134 to the flange 132 is different from the adhesive used to bond the intermediate portion 134 to the ring 130.

Referring to FIG. 8, the intermediate portion 134 includes an axial segment 250, extending along the longitudinal axis "LA," and a radial segment 252, extending radially outwardly from the axial segment 250 along a radial plane "RP" perpendicular to the longitudinal axis "LA." The axial segment 250 of the intermediate portion 134 includes an axial end face 254, which is annular. The axial end face 254 of the intermediate portion 134 is connected to the proximal ring face 212 of the ring 130. The radial segment 252 of the intermediate portion 134 includes an outer circumferential radial surface 257 circumscribing the axial segment 250 of the intermediate portion 134. The outer circumferential radial surface 257 of the intermediate portion 134 is connected to the inner circumferential flange surface 237 of the flange 132.

The intermediate portion 134 includes an inner shaft engagement surface 259 and an outer relief surface 265 in opposing relationship to the inner shaft engagement surface 259. The outer relief surface 265 is in general circumscribing relationship with the inner shaft engagement surface 259. The inner shaft engagement surface 259 has a taper portion 267 which is convex and has a first radius "$R_1$" of curvature. The outer relief surface 265 has a concave portion 269 with a second radius "$R_2$" of curvature. In embodiments, the first radius "$R_1$" of curvature is larger than the second radius "$R_2$" of curvature. In embodiments, a ratio of the first radius "$R_1$" of curvature to the second radius "$R_2$" of curvature is in a range between greater than 1 and 30, in a range between greater than 1 and 20 in other embodiments, in a range between 5 and 25 in still other embodiments, and between 10 and 20 in yet other embodiments. In embodiments, a ratio of the first radius "$R_1$" of curvature to the second radius "$R_2$" of curvature is in a range between 15 and 20.

The intermediate portion 134 defines an intermediate passage 271. The inner shaft engagement surface 259 defines the intermediate passage 271 which is configured to allow the shaft 112 to extend therethrough. In embodiments, the intermediate passage 271 is configured such that the shaft 112 and the intermediate portion 134 having an interfering fit therebetween such that at least a portion of the intermediate portion 134 is flexed radially outwardly. In the illustrated embodiment, at least the taper portion 267 of the inner shaft engagement surface 259 is in interfering relationship with the shaft 112 when the seal member 110 is in the assembled position (see FIG. 8).

Figure 13:
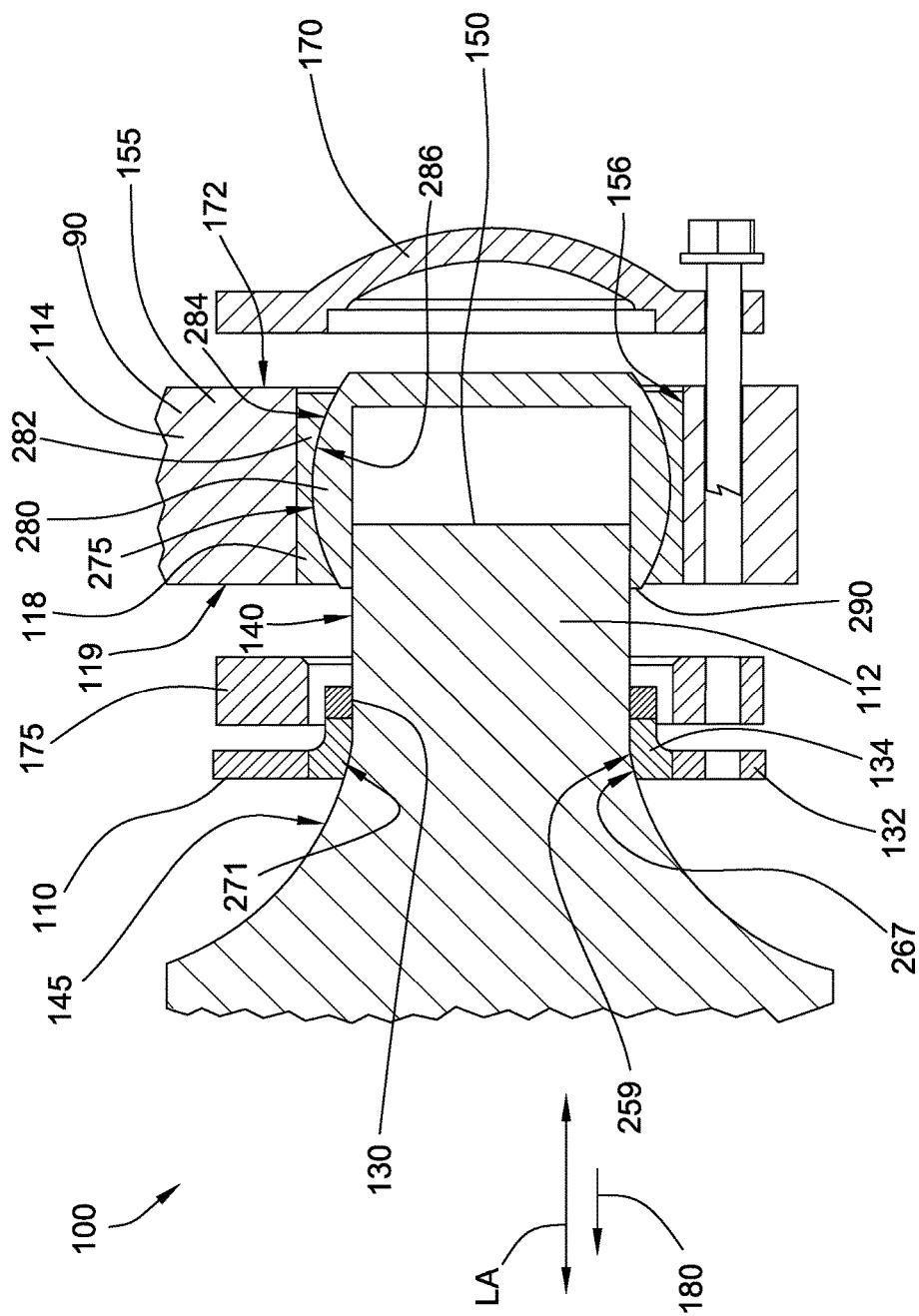
FIG. 13 is an enlarged, sectional view of the joint assembly of FIG. 2, illustrating the joint assembly in a partially assembled position.

Referring to FIG. 13, the bearing 118 is provided to facilitate the relative movement of the pivot member 114 and the shaft 112. The bearing 118 defines a bearing interface 275 about which the pivot member 114 is pivotable with respect to the shaft 112.

The illustrated bearing 118 includes an inner ring bearing member 280 and an outer race bearing member 282. The inner ring bearing member 280 has a spherically convex exterior bearing surface 284. The inner ring bearing member 280 is configured to be mounted to the distal end 150 of the shaft 112. The inner ring bearing member 280 can include inner ring mounting holes corresponding to and aligning with the bearing mounting holes 152 in the distal end 150 of the shaft 112.

The outer race bearing member 282 is attached to the mounting head 155 of the extendable cylinder 90. The outer race bearing member 282 is disposed within the inner circumferential mounting head surface 156.

The outer race bearing member 282 has a spherically concave interior bearing surface 286 defining a cavity therewithin. The concave interior bearing surface 286 of the outer race bearing member 282 includes a shape that is complementary to the shape of the convex exterior bearing surface 284 of the inner ring bearing member 280.

The inner ring bearing member 280 is disposed within the cavity of the outer race bearing member 282 with the spherically concave interior bearing surface 286 of the outer race bearing member 282 concentrically circumscribing the spherically convex exterior bearing surface 284 of the inner ring bearing member 280. The spherically convex exterior bearing surface 284 of the inner ring bearing member 280 and the spherically concave interior bearing surface 286 of the outer race bearing member 282 define the bearing interface 275.

In embodiments, seals (such as those shown and described in U.S. Pat. No. 6,626,575, for example) can be provided on both sides of the outer race bearing member 282 that help seal the bearing interface 275. In embodiments, one or both of the convex exterior bearing surface 284 of the inner ring bearing member 280 and the concave interior bearing surface 286 of the outer race bearing member 282 can have a friction-reducing liner applied thereto. In embodiments, the friction-reducing liner can be made from any suitable material, such as, PTFE, for example.

Referring to FIG. 13, the joint assembly 100 is shown in a partially assembled position. To assemble the joint assembly 100, the bearing 118 can be mounted to the extendable cylinder 90. The seal member 110 and the inner retention ring 175 rest on the shaft 112.

A slight clearance between the ring 130 of the seal member 110 and the shaft 112 allow the seal member 110 to be mounted onto the shaft 112 from the distal end 150 thereof. The taper portion 267 of the inner shaft engagement surface 259 of the seal member 110 can act in the manner of a countersink to facilitate the insertion of the distal end 115 of the shaft 112 through the intermediate passage 271. The seal member 110 can move along the rotational axis "RA" in the inboard direction 180 until the taper portion 267 seats against the concave taper surface 145. In embodiments, a lubricant may be applied to the exterior surface 140 of the shaft 112 to facilitate the translation of the intermediate portion 134 along the rotational axis "RA" of the shaft 112 into the position shown in FIG. 13.

The inner ring bearing member 280 of the bearing 118 is then seated onto the distal end 150 of the shaft 112. The inner ring bearing member 280 can be moved relative shaft along the rotational axis "RA" in the inboard direction 180 and the inner ring bearing member 280 can be rotated relative to the rotational axis "RA" to align the mounting holes in the inner ring bearing member 280 with the bearing mounting holes 152 in the shaft 112. The inner ring bearing member 280 can then be connected to the distal end 150 of the shaft 112 using suitable fasteners.

The outer seal cover 170 can be assembled to the outboard side 172 of the pivot member 114. The inner retention ring 175 and the seal member 110 can be bolted together to the inboard side 119 of the pivot member 114. With the flange 132 of the seal member 110 secured to the pivot member 114, the ring 130 of the seal member 110 is in contacting relationship with the bearing 118 and the intermediate portion 134 is in interfering, sealing relationship with the exterior surface 140 of the shaft 112, as shown in FIG. 14.

Figure 14:
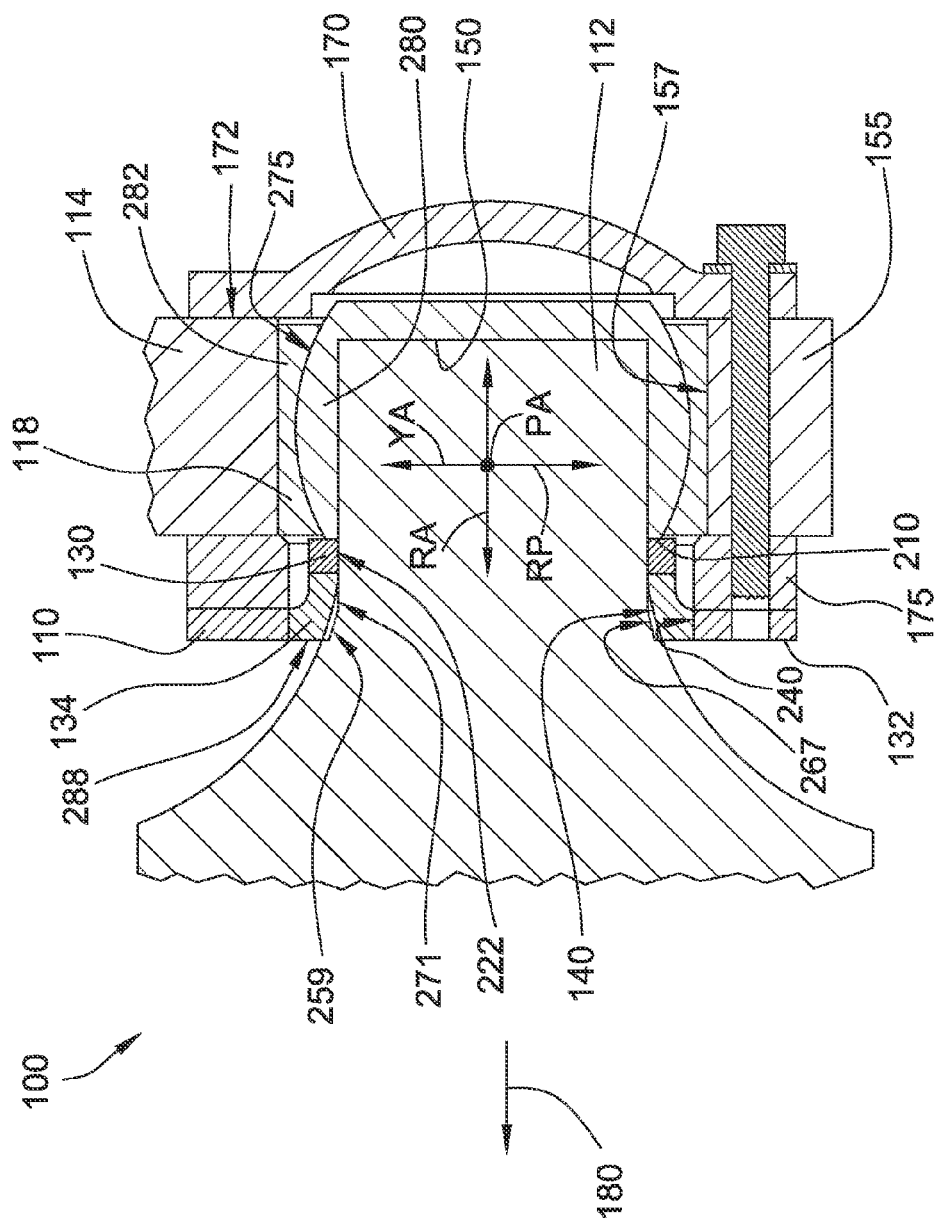
FIG. 14 is a view as in FIG. 13, but illustrating the joint assembly of FIG. 2 in an assembled position.

Referring to FIG. 14, the joint assembly 100 is shown in an assembled position. The shaft 112 extends through the flange opening 240 of the flange 132, the intermediate passage 271 of the intermediate portion 134, and the ring opening of the ring 130. The shaft 112 is disposed within the mounting passage 157 of the pivot member 114. The inner ring bearing member 280 of the bearing 118 is connected to the distal end 150 of the shaft 112.

The bearing 118 is interposed between the shaft 112 and the pivot member 114. The bearing 118 is mounted to the distal end 150 of the shaft 112 and to the mounting head 155 of the pivot member 114 such that the outer race bearing member 282 is relatively movable with respect to the inner ring bearing member 280 about the bearing interface 275.

The bearing 118 allows the pivot member 114 to move with respect to the shaft 112 about the rotational axis "RA" and in an out-of-plane movement relative to a radial plane "RP" that is perpendicular to the rotational axis "RA." The radial plane "RP" can be defined by a pitch axis "PA" and a yaw axis "YA," which are mutually perpendicular to the rotational axis "RA" and to each other. Out-of-plane movement can occur about one or both of the pitch axis "PA" and the yaw axis "YA," such as when the dump body 68 undergoes racking under load or during a dumping sequence.

The inner retention ring 175 circumscribes the shaft 112 and is in interfering relationship with the bearing 118 to inhibit relative movement of the bearing 118 along the rotational axis "RA" in the inboard direction 180 toward the inner retention ring 175 with respect to the mounting head 155 of the pivot member 114. The outer seal cover 170 is mounted to the outboard side 172 of the pivot member 114 such that the mounting passage 157 is occluded from the outboard side 172 by the outer seal cover 170.

The flange 132 is fixed relative to the pivot member 114. The illustrated flange 132 is connected to the inner retention ring 175. The flange 132 of the seal member 110 is disposed in spaced relationship to the ring 130 along the rotational axis "RA."

The intermediate portion 134 is in sealing engagement with the shaft 112. The shaft 112 and the intermediate portion 134 have an interfering fit therebetween such that at least a portion of the intermediate portion 134 is flexed radially outwardly. In the illustrated embodiment, at least the taper portion 267 of the inner shaft engagement surface 259 of the intermediate portion 134 is in interfering relationship with the shaft 112 when the seal member 110 is in the assembled position.

The intermediate portion 134 can help maintain the ring 130 in contacting engagement with the bearing 118. The intermediate portion 134 can accommodate angular misalignment between the pivot member 114 and the shaft 112 while maintaining the contacting relationship between the ring 130 and the bearing 118. The intermediate portion 134 can also resist pressure applied to the inboard surface 288 of the seal member 110 exposed to mud and other debris.

The ring 130 is adjacent the pivot member 114. The seal member 110 is arranged with the bearing 118 such that the ring 130 of the seal member 110 is in engaging contact with the bearing 118. The distal ring face 210 of the ring 130 is fitted on the bearing 118. The ring 130 is configured to inhibit the movement of contaminants from the inboard side of the pivot member 114 into the maintenance free bearing 118. The ring 130 can help prevent the intermediate portion 134 from buckling when subjected to compressive loading.

The inner circumferential ring surface of the ring 130 is in proximate relationship with the shaft 112 with a slip fit therebetween such that the ring 130 is pivotable about the rotational axis "RA" with respect to the shaft 112. The ring 130 slips relative to the shaft 112 when the pivot member 114 rotates about the rotational axis "RA."

Figure 15:
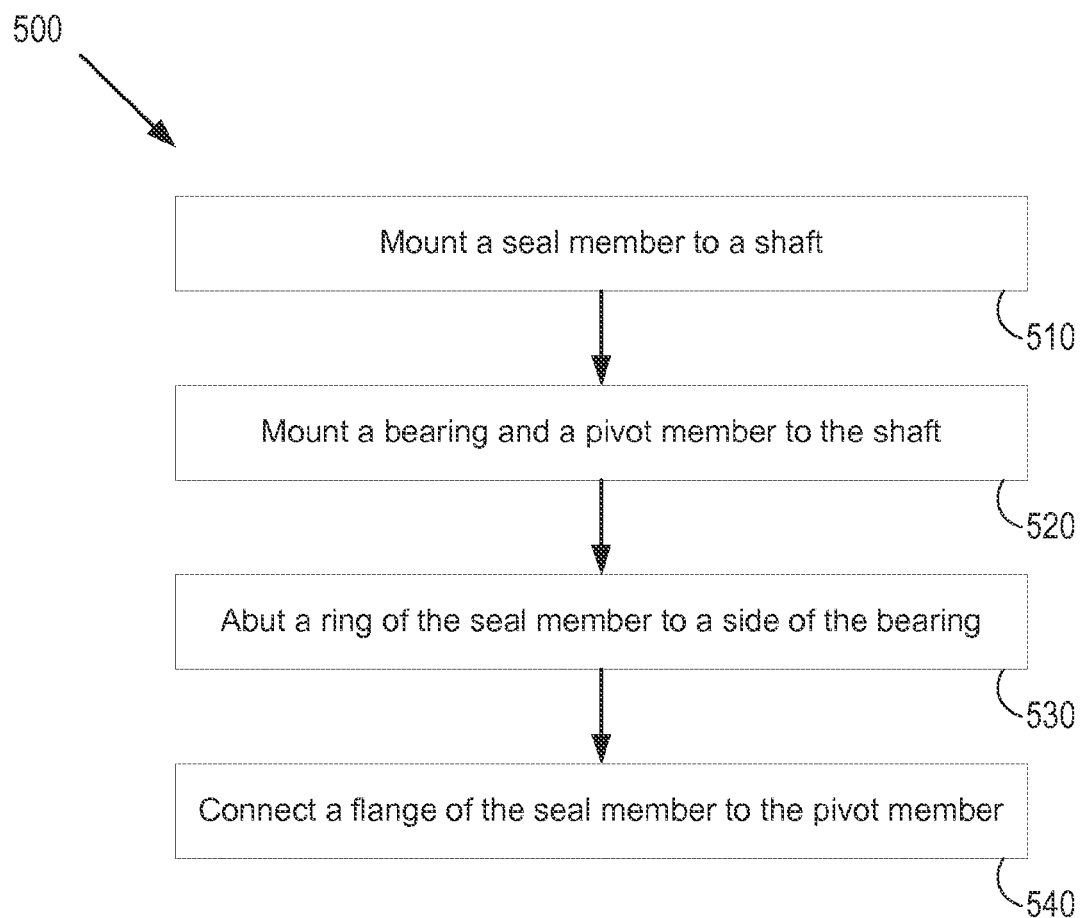
FIG. 15 is a flowchart illustrating steps of an embodiment of a method of assembling a joint of a machine following principles of the present disclosure.

Referring to FIG. 15, and with further reference to FIGS. 13 and 14, steps of an embodiment of a method 500 of assembling a joint of a machine following principles of the present disclosure are shown. The method 500 includes mounting a seal member 110 to a shaft 112 (step 510) and mounting a bearing 118 and a pivot member 114 to the shaft 112 (step 520).

The shaft 112 defines a rotational axis "RA." The seal member 110 includes a ring 130, a flange 132, and an intermediate portion 134 interposed between the ring 130 and the flange 132. The ring 130 includes an inner ring perimeter 220 defining a ring opening 222. The shaft 112 extends through the ring opening 222. The ring 130 is in proximate relationship with the shaft 112 with a slip fit therebetween such that the ring 130 is pivotable about the rotational axis "RA" with respect to the shaft 112. The intermediate portion 134 is resiliently flexible. The intermediate portion 134 defines an intermediate passage 271. The shaft 112 extends through the intermediate passage 271. The flange 132 extends radially from the intermediate portion 134 and circumscribes the shaft 112. In embodiments, the ring 130 and the flange 132 are both more rigid than the intermediate portion 134 of the seal member 110.

The pivot member 114 has a mounting head 155 defining a mounting passage 157 therethrough. The bearing 118 is disposed within the mounting passage 157. The bearing 118 and the mounting head 155 are in circumscribing relationship with the shaft 112. The pivot member 114 is movable relative to the shaft 112 about the rotational axis "RA."

The method 500 further includes abutting the ring 130 of the seal member 110 to an inboard bearing side 290 of the bearing 118 (step 530). In embodiments, the intermediate portion 134 of the seal member 110 is in interfering engagement with the shaft 112 when the ring 130 of the seal member 110 is abutting the inboard bearing side 290 of the bearing 118.

The flange 132 of the seal member 110 is connected to the pivot member 114 such that the seal member 110 is movable relative to the shaft 112 about the rotational axis "RA" (step 540). In embodiments, the pivot member 114 includes an inner retention ring 175 which is mounted to an inboard pivot member side 119 of the pivot member 114. The inner retention ring 175 circumscribes the shaft 112 and is in interfering relationship with the bearing 118 to inhibit relative movement of the bearing 118 along the rotational axis "RA" in the inboard direction 180 toward the inner retention ring 175 with respect to the mounting head 155 of the pivot member 114. The flange 132 of the seal member 110 can be connected to the inner retention ring 175 of the pivot member 114.

In embodiments, the method 500 further includes coupling an outer race bearing member 282 of the bearing 118 with the mounting head 155 of the pivot member 114. The outer race bearing member 282 is disposed within the mounting passage 157. A distal end 150 of the shaft 112 is inserted into an inner ring bearing member 280 of the bearing 118. The inner ring bearing member 280 and the outer race bearing member 282 define a bearing interface 275 therebetween. The inner ring bearing member 280 is connected to the shaft 112. An outer seal cover 170 is mounted to an outboard side 172 of the pivot member 114 such that the mounting passage 157 of the pivot member 114 is occluded from the outboard side 172 by the outer seal cover 170.

INDUSTRIAL APPLICABILITY

The industrial applicability of the embodiments of a seal member described herein will be readily appreciated from the foregoing discussion. At least one embodiment of a seal member described herein can be used in a joint assembly of a machine. At least one embodiment of a joint assembly described herein can be used to pivotably mount a hoist cylinder configured to selectively lift a dump body of a machine in a pivoting motion.

Embodiments of a seal member according to principles of the present disclosure may find potential application in any suitable machine. Such machines may include, but are not limited to, off-highway trucks, dozers, loaders, excavators, or any other mobile or stationary machines that utilize a joint assembly or a sealing relationship as described herein.

Embodiments of a seal member according to principles of the present disclosure can be used to provide a seal for a maintenance-free bearing of a bearing joint provided to pivotably attach a pivot member, such as a hoist cylinder, to the frame of a machine. Typically, such a bearing is greased lubricated and requires lubrication application twice a day. A seal member according to principles of the present disclosure can be used to protect a maintenance free bearing which is not lubricated as described. A seal member according to principles of the present disclosure can provide a robust sealing solution to keep dirt and contaminants from the maintenance-free bearing.

A joint assembly constructed in accordance with principles of the present disclosure can accommodate multiple motions (such as relative movement with at least two degrees of freedom) by the pivot member while maintaining a sealing relationship that helps keep dirt and debris from the bearing. The intermediate portion of the seal member is resiliently flexible and can flex in response to the different types of relative movement made by the pivot member (e.g., rotation, misalignment, and out of plane motion such as caused by racking). The intermediate portion can help resist the fluid pressure exerted by mud packing around the joint assembly.

In a misalignment condition, strain can be non-uniformly distributed along the circumference (less on the tilted side and high on the other side) of the intermediate portion. However, contact pressure between the ring and the bearing can be relatively uniformly distributed around the circumference of the ring in both a normal, assembled condition and the misalignment condition.

The disclosed techniques may be applicable to provide a seal which when installed will have an interference fit between the shaft and the seal, thereby providing a sealing mechanism against dirt, mud and other environmental conditions. The disclosed techniques may be applicable to provide a seal where the sealing mechanism is resistant to mud packing by the addition of a rigid ring on the seal side facing the bearing.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. It should be understood that terms such as "front," "rear," "upper," "lower," "inboard," "outboard," "inner," and "outer" are used only for convenient reference and should not be viewed as limiting in any way. All language of distinction and disparagement with respect to certain features is intended to indicate a lack of preference for the features of interest, but not to exclude such from the scope of the disclosure entirely unless otherwise specifically indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A seal member for a joint between a pivot member movable about a rotational axis of a shaft, the seal member comprising:

a ring, the ring including a distal ring face and a proximal ring face, the distal ring face and the proximal ring face both being planar and annular and being disposed in spaced relationship to each other along a longitudinal axis, the ring including an outer circumferential ring surface extending along the longitudinal axis between the distal ring face and the proximal ring face at an outer ring perimeter thereof and circumscribing the distal ring face and the proximal ring face, the ring including an inner circumferential ring surface extending along the longitudinal axis between the distal ring face and the proximal ring face at an inner ring perimeter thereof, the inner circumferential ring surface being disposed radially within the outer circumferential ring surface, the inner ring perimeter defining a ring opening;

a flange, the flange including a pair of flange faces disposed in spaced relationship to each other along the longitudinal axis, the flange including an outer flange surface extending along the longitudinal axis between the pair of flange faces at an outer flange perimeter thereof, the flange including an inner circumferential flange surface extending along the longitudinal axis between the pair of flange faces at an inner flange perimeter thereof, the inner circumferential flange surface disposed radially within the outer flange surface; and an intermediate portion, the intermediate portion bonded to both the ring and the flange such that the intermediate portion is interposed between the ring and the flange, the intermediate portion being resiliently flexible, the intermediate portion bonded to the proximal ring face of the ring and to the inner circumferential flange surface of the flange such that the ring is relatively movable with respect to the flange, the intermediate portion including an inner shaft engagement surface and an outer relief surface in opposing relationship to the inner shaft engagement surface, the inner shaft engagement surface of the intermediate portion having a taper portion with a first radius of curvature, and the outer relief surface having a concave portion with a second radius of curvature, and the first radius of curvature being larger than the second radius of curvature.

2. The seal member according to claim 1, wherein the outer circumferential ring surface defines an outer ring diameter, and the inner circumferential flange surface of the flange defines an inner flange diameter, the outer ring diameter of the ring being less than the inner flange diameter of the flange.

3. The seal member according to claim 1, wherein the flange defines at least one mounting hole extending along the longitudinal axis between the pair of flange faces.

4. The seal member according to claim 1, wherein the ring is disposed in spaced relationship to the flange along the longitudinal axis such that the proximal ring face is disposed a longitudinal offset distance from the flange.

5. The seal member according to claim 4, wherein the intermediate portion includes an axial segment, extending along the longitudinal axis, and a radial segment, extending radially outwardly along a radial plane perpendicular to the longitudinal axis, the axial segment of the intermediate portion including an axial end face, the axial end face being annular and bonded to the proximal ring face of the ring, the radial segment of the intermediate portion including an outer circumferential radial surface circumscribing the axial segment of the intermediate portion, the outer circumferential radial surface of the intermediate portion bonded to the inner circumferential flange surface of the flange.

6. The seal member according to claim 1, wherein the ring and the flange are both more rigid than the intermediate portion.

7. The seal member according to claim 6, wherein the ring is made from nylon, the flange is made from metal, and the intermediate portion is made from rubber.

8. A joint assembly for a machine, the joint assembly comprising:

a shaft defining a rotational axis;

a pivot member, the pivot member mounted with respect to the shaft such that the pivot member is pivotable about the rotational axis with respect to the shaft; and a seal member, the seal member mounted to the pivot member and pivotable about the rotational axis with respect to the shaft, the seal member including:

a ring, the ring being adjacent the pivot member, the ring including a distal ring face and a proximal ring face, the distal ring face and the proximal ring face both being planar and annular and being disposed in spaced relationship to each other along the rotational axis, the ring including an outer circumferential ring surface extending along the rotational axis between the distal ring face and the proximal ring face at an outer ring perimeter thereof and circumscribing the distal ring face and the proximal ring face, the ring including an inner circumferential ring surface extending along the rotational axis between the distal ring face and the proximal ring face at an inner ring perimeter thereof, the inner ring perimeter defining a ring opening, the shaft extending through the ring opening, a flange, the flange disposed in spaced relationship to the ring along the rotational axis, the flange including a pair of flange faces disposed in spaced relationship to each other along the rotational axis, the flange including an outer flange surface extending along the rotational axis between the pair of flange faces at an outer flange perimeter thereof, the flange including an inner circumferential flange surface extending along the rotational axis between the pair of flange faces at an inner flange perimeter thereof, the inner circumferential flange surface disposed radially within the outer flange surface, the inner circumferential flange surface defining a flange opening, the shaft extending through the flange opening, the flange fixed relative to the pivot member, and an intermediate portion, the intermediate portion bonded to both the ring and the flange such that the intermediate portion is interposed between the ring and the flange along the rotational axis, the intermediate portion being resiliently flexible, the intermediate portion bonded to the proximal ring face of the ring and to the inner circumferential flange surface of the flange such that the ring is relatively movable with respect to the flange, the intermediate portion defining an intermediate passage, the shaft extending through the intermediate passage, the shaft and the intermediate portion having an interfering fit therebetween such that at least a portion of the intermediate portion is flexed radially outwardly, the intermediate portion including an inner shaft engagement surface and an outer relief surface in opposing relationship to the inner shaft engagement surface, the inner shaft engagement surface of the intermediate portion having a taper portion with a first radius of curvature, and the outer relief surface having a concave portion with a second radius of curvature, and the first radius of curvature being larger than the second radius of curvature.

9. The joint assembly according to claim 8, wherein the ring and the flange are both more rigid than the intermediate portion of the seal member.

10. The joint assembly according to claim 9, wherein the shaft has an exterior surface, and the inner circumferential ring surface of the ring is in proximate relationship with the shaft with a slip fit therebetween such that the ring is pivotable about the rotational axis with respect to the shaft.

11. The joint assembly according to claim 10, wherein the ring of the seal member is made from nylon, the flange of the seal member is made from metal, and the intermediate portion of the seal member is made from rubber.

12. The joint assembly according to claim 9, further comprising:
a bearing, the bearing interposed between the shaft and the pivot member, the bearing defining a bearing interface about which the pivot member is pivotable with respect to the shaft;
wherein the seal member is arranged with the bearing such that the ring of the seal member is in engaging contact with the bearing.

13. The joint assembly according to claim 12, wherein the shaft includes a distal end, the pivot member comprises a cylinder having a mounting head, the mounting head defining a mounting head passage, the shaft disposed within the mounting head passage, the bearing includes an inner ring bearing member and an outer race bearing member, the inner ring bearing member having a spherically convex exterior bearing surface and being mounted to the distal end of the shaft, the outer race bearing member having a spherically concave interior bearing surface defining a cavity within the outer race bearing member, the inner ring bearing member disposed within the cavity of the outer race bearing member with the spherically concave interior bearing surface of the outer race bearing member concentrically circumscribing the spherically convex exterior bearing surface of the inner ring bearing member, the spherically convex exterior bearing surface of the inner ring bearing member and the spherically concave interior bearing surface of the outer race bearing member defining the bearing interface, the cylinder including an outer seal cover mounted to an outboard side thereof such that the mounting head passage is occluded from the outboard side by the outer seal cover, and the seal member is disposed adjacent an inboard pivot member side of the cylinder, the seal member at least partially occluding the mounting head passage from the inboard pivot member side.

14. The joint assembly according to claim 12, wherein the ring of the seal member is made from nylon, the flange of the seal member is made from metal, and the intermediate portion of the seal member is made from rubber.

15. The joint assembly according to claim 13, wherein the ring of the seal member is made from nylon, the flange of the seal member is made from metal, and the intermediate portion of the seal member is made from rubber.

16. The joint assembly according to claim 9, wherein the ring of the seal member is made from nylon, the flange of the seal member is made from metal, and the intermediate portion of the seal member is made from rubber.

17. The joint assembly according to claim 8, wherein the outer circumferential ring surface of the seal member defines an outer ring diameter, and the inner circumferential flange surface of the flange of the seal member defines an inner flange diameter, the outer ring diameter of the ring being less than the inner flange diameter of the flange.

18. The joint assembly according to claim 8, wherein the flange of the seal member defines at least one mounting hole extending along the longitudinal axis between the pair of flange faces.

19. The joint assembly according to claim 8, wherein the ring of the seal member is disposed in spaced relationship to the flange of the seal member along the longitudinal axis such that the proximal ring face is disposed a longitudinal offset distance from the flange.

20. The joint assembly according to claim 19, wherein the intermediate portion of the seal member includes an axial segment, extending along the longitudinal axis, and a radial segment, extending radially outwardly along a radial plane perpendicular to the longitudinal axis, the axial segment of the intermediate portion including an axial end face, the axial end face being annular and bonded to the proximal ring lace of the ring of the seal member, the radial segment of the intermediate portion including an outer circumferential radial surface circumscribing the axial segment of the intermediate portion, the outer circumferential radial surface of the intermediate portion bonded to the inner circumferential flange surface of the flange of the seal member.

* * * * *